(12) United States Patent
Walker

(10) Patent No.: US 12,167,802 B1
(45) Date of Patent: Dec. 17, 2024

(54) INTERACTIVE PRODUCT DISPLAY CASE

(71) Applicant: Brian Walker, Monticello, MN (US)

(72) Inventor: Brian Walker, Monticello, MN (US)

( * ) Notice: Subject to any disclaimer, the term of this patent is extended or adjusted under 35 U.S.C. 154(b) by 666 days.

(21) Appl. No.: 17/300,160

(22) Filed: Apr. 5, 2021

Related U.S. Application Data

(60) Provisional application No. 63/100,971, filed on Apr. 11, 2020.

(51) Int. Cl.
| | |
|---|---|
| A47F 3/00 | (2006.01) |
| A47B 73/00 | (2006.01) |
| A47B 81/00 | (2006.01) |
| A47F 7/02 | (2006.01) |
| G06F 3/041 | (2006.01) |
| G09F 9/33 | (2006.01) |
| H04B 5/72 | (2024.01) |

(52) U.S. Cl.
CPC ............. *A47F 3/001* (2013.01); *A47B 73/00* (2013.01); *A47B 81/005* (2013.01); *A47F 3/002* (2013.01); *A47F 3/007* (2013.01); *A47F 7/022* (2013.01); *G06F 3/041* (2013.01); *G09F 9/33* (2013.01); *H04B 5/72* (2024.01)

(58) Field of Classification Search
CPC .......... A47F 3/001; A47F 3/002; A47F 3/007; A47F 7/022; A47B 73/00; A47B 81/005; G06F 3/041; G09F 9/33; H04B 5/0031
See application file for complete search history.

(56) References Cited

U.S. PATENT DOCUMENTS

| | | | | |
|---|---|---|---|---|
| 2014/0144083 A1* | 5/2014 | Artwohl | ................ | A47F 3/0434 49/70 |
| 2015/0041786 A1* | 2/2015 | Li | ........................ | G02F 1/13306 257/40 |
| 2017/0358713 A1* | 12/2017 | Hong | ...................... | H01L 33/56 |
| 2020/0259246 A1* | 8/2020 | Kim | ........................ | H01Q 21/28 |

FOREIGN PATENT DOCUMENTS

| | | | | | |
|---|---|---|---|---|---|
| CN | 110782794 A | * | 2/2020 | ............. | G09F 9/301 |
| KR | 101861818 B1 | * | 5/2018 | ............... | G09F 9/30 |

\* cited by examiner

*Primary Examiner* — Quan Zhen Wang
*Assistant Examiner* — Rajsheed O Black-Childress
(74) *Attorney, Agent, or Firm* — Johnson And Phung; Thomas N. Phung

(57) ABSTRACT

An interactive product display including a LED film and a touchscreen secured to a transparent panel of a display case with a product within the display case viewable through a line of sight viewing through the transparent panel and information viewing on the product through the LED film in response to a customer touching the touchscreen proximate the transparent panel.

5 Claims, 2 Drawing Sheets

INTERACTIVE PRODUCT DISPLAY CASE

CROSS REFERENCE TO RELATED APPLICATIONS

This application claims priority from provisional application Ser. No. 63/100,971 filed Apr. 11, 2020.

FIELD OF THE INVENTION

This invention relates to product display cases and more specifically, to commercial product display cases that can be converted from a passive product display case to an interactive product display case.

STATEMENT REGARDING FEDERALLY SPONSORED RESEARCH OR DEVELOPMENT

None

REFERENCE TO A MICROFICHE APPENDIX

None

BACKGROUND OF THE INVENTION

Static product display cases, which are located in retail establishments, typically include a transparent panel for a line of sight viewing of products located within the product display case. For security purposes the product display case may be locked, which requires one to obtain authorization to open the product display case in order to inspect the products therein. This procedure can be both annoying and time consuming for both a customer and a store proprietor.

SUMMARY OF THE INVENTION

The present invention comprises an interactive product display case as well as an aftermarket method or kit to convert a static product display case to an interactive product display case so that a potential customer can obtain additional product information or gain access to the products within the product display case without having to seek assistance. The customer interactive product display case includes a transparent panel for line of sight viewing of a product within the product display case from outside the product display case, an LED film and a touchscreen to enable a customer to access information on a product within the product display case by touching an external face of the transparent panel to display an image on the LED film on the transparent panel.

The invention further includes a method of converting a static product display case to an interactive product display case by securing a touchscreen, a LED film and an antenna to the transparent panel of the static product display case.

The invention further includes a kit comprising a LED film, a transparent NFC antenna and a touchscreen that can be sandwichingly secured to a static display case transparent panel connectable to a media player to convert the static display case to an interactive display case, without structurally altering the static display case.

BACKGROUND OF THE INVENTION

Figure 1:
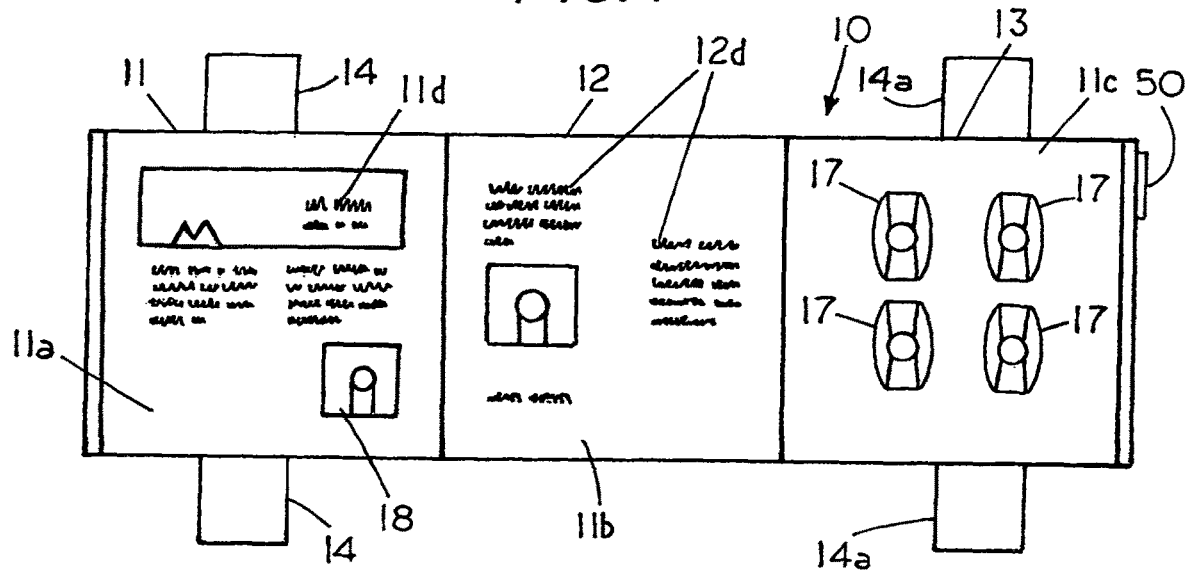
FIG. 1 is a top view of three adjacent product display cases with two display cases in a powered condition and one display case in an unpowered condition.

In a typical retail store numerous products are displayed within glass front or glass top product display cases. Typically, a customer enters the retail store and views the products within the display cases by peering through a rigid transparent panel such as a clear glass display case panel, which prevents the customer from inspecting the product or obtaining information that may be on the product. Although some products include their own packaging containing information about the products, in general the information available from viewing the product package is limited. In some cases the products in the display case may not be housed in the original package and in other cases original information printed on or attached to the product may not be up to date thus making it difficult for a customer to obtain useful information on the product. Adding to the difficulty of obtaining information on the product is that the product display cases may be locked or positioned so that a customer cannot readily obtain access to inspect the product therein. This is particularly true where the products are expensive or there are products such as liquor and firearms that should only be available to qualified customers.

DESCRIPTION OF THE PREFERRED EMBODIMENT

The invention comprises an interactive display case where the interactive display case has been converted from a conventional static product display case to an interactive case through an aftermarket kit. The interactive display case having a proximity sensitive flexible transparent film i.e. touchscreen mounted on an interior surface of a product display case to allow a potential customer to obtain information related to a product located within the display case. The interactive display case allowing the potential customer to quickly access additional information on the product within the display case through the touchscreen by allowing the customer to identify the product for inspection as well as to communicate with a processor such as a display case processor, which may be a media player, using cellular, near field communication (NFC) or Bluetooth typically through a customers mobile device such as a smart phone.

The interactive display case described herein includes a flexible thin film transparent touchscreen mounted to an interior surface of a rigid transparent panel such as a clear glass panel, which is part of the display case. The thin film transparent touchscreen film conducts electricity and is proximate sensitive so that a person touching an exterior surface of the transparent panel can communicate with a display case processor to retrieve information on a product in the display case.

Although other sizes may be used examples of usable dimensions and features of the invention include a flexible thin film transparent touchscreen display between 20-48 inches in width and between 12-32 inches in height. In the example shown herein the interactive display case includes a transparent LED display, such as an LED film and an antenna such as an NFC antenna that is sandwiched to a transparent panel of a static product display case to convert the static product display case to an interactive product display case that can communicate with a display case processor, which may be a media player. The media player, which may be attached to the product display case is addressable through Wi-Fi, NFC, Bluetooth or 4G/5G cellular allowing the transparent LED display to be remotely addressable and programmable.

Figure 2:
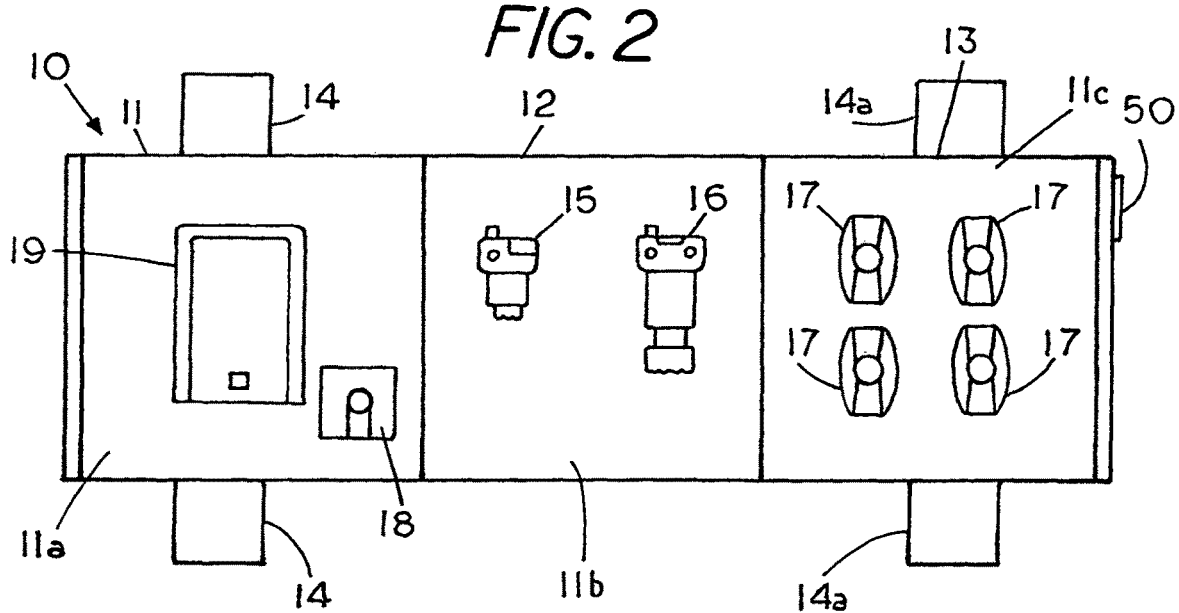
FIG. 2 is a top view of the product display cases of FIG. 1, with each of the product display cases in an unpowered condition.
Figure 5:
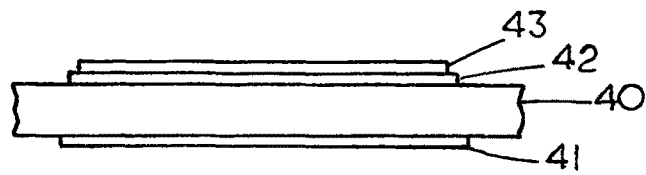
FIG. 5 is an isolated view showing a portion of a transparent panel supporting an LED film on one side of the transparent panel and a touchscreen and NFC antenna mounted on the opposite side of the transparent panel.
Figure 6:
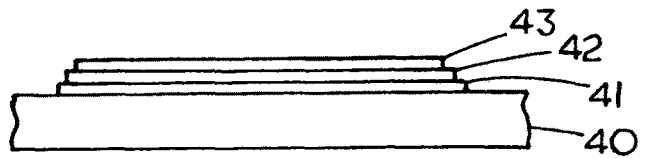
FIG. 6 is an isolated view of a transparent panel supporting an LED film a touchscreen and an NFC antenna all on an interior face of a transparent panel.

FIG. 1 is a top view of a multi-compartment interactive product display case 10 comprising three product display units 11, 12 and 13, which are supported on leg 14 and leg 14a with product display units 11 and 12 in a powered condition and product display unit 13 in an unpowered condition. FIG. 2 shows the product display case 10 of FIG. 1 with all the product display units 11, 12 and 13 in an unpowered condition. In the powered condition panel 11a contains an image 11d and panel 11b contain an image 12d thereon that may prevent a line of sight viewing of a product within the display case 10 although in some cases it may not interfere with viewing the product behind the transparent panel of the display case. That is the images 11d and 12d contain product information that is displayed on a LED film located on a transparent panel of the display case 10, where the images on the LED film are located in a line of sight between a viewer and the product within the display case 10. In contrast, panel 11c is shown in an unpowered or transparent mode where a normal line of sight viewing of products 17 in the display case 10 extends through a display case transparent panel 11c having a transparent nfc antenna, a touchscreen and a LED film in a transparent mode thereon. FIG. 5 and FIG. 6 illustrate how attachments to the transparent panel 40 may be adhered proximate to the panel 40 along a line of sight between a viewer and a product in the display case but do not prevent line of sight viewing since the attachments are either transparent or have a transparent mode.

In the unpowered condition, as shown in FIG. 2, products 17 are visible in line of sight viewing through the display case transparent panel 11c and attachments thereto. That is, products 15 and 16 are visible through the display case transparent panel 11b and product 18 is visible through the display case transparent panel 11a, where the transparent panel may be a rigid sheet of glass that forms a side of the display case with the transparent panel supporting a set of attachments. FIG. 2 shows that panel 11a includes an outline of a region 19 thereon where a user can place a smartphone proximate the region 19 to obtain wireless data transmission between the product display case 10 and the display case processor 50, which may be a media player. For example, through NFC communication between the smart phone and the NFC antenna attached to the transparent panel 11a. Thus, a smart phone may be used to activate an information mode on a media player 50 to display product information and other image information on the panels 11a, 11b and 11c all in response to user placement of a smart phone or the like proximate region 19. Similarly, removing the smart phone can deactivate the image information on the product display unit and bring the product display case 10 to a visual line of sight mode without images visible on the LED film.

The product display units 11, 12 and 13 each include a transparent panel such as a glass panel and an LED film thereon that connects to an external power source and a central processing unit (CPU) 50 that may be in on or proximate the display case 10. In this example the processor 50 can control images and information displayed on the panels 11a 11b and 11c. In the example shown in FIG. 1 information about product 18 is shown on panel 11a and information on products 15 and 16 is shown on panel 11b and information on product 17 can be shown on panel 11c all in response to placement of a smart phone proximate region 19 on LCD panel 11a.

FIG. 2 is a top view of the product display case 10 of FIG. 1 with each of the product display units 11a, 11b and 11c in an unpowered condition to enable line of sight viewing of the products in the display case through the panels 11a, 11b and 11c, when the LED film is in the transparent mode.

Figure 3:
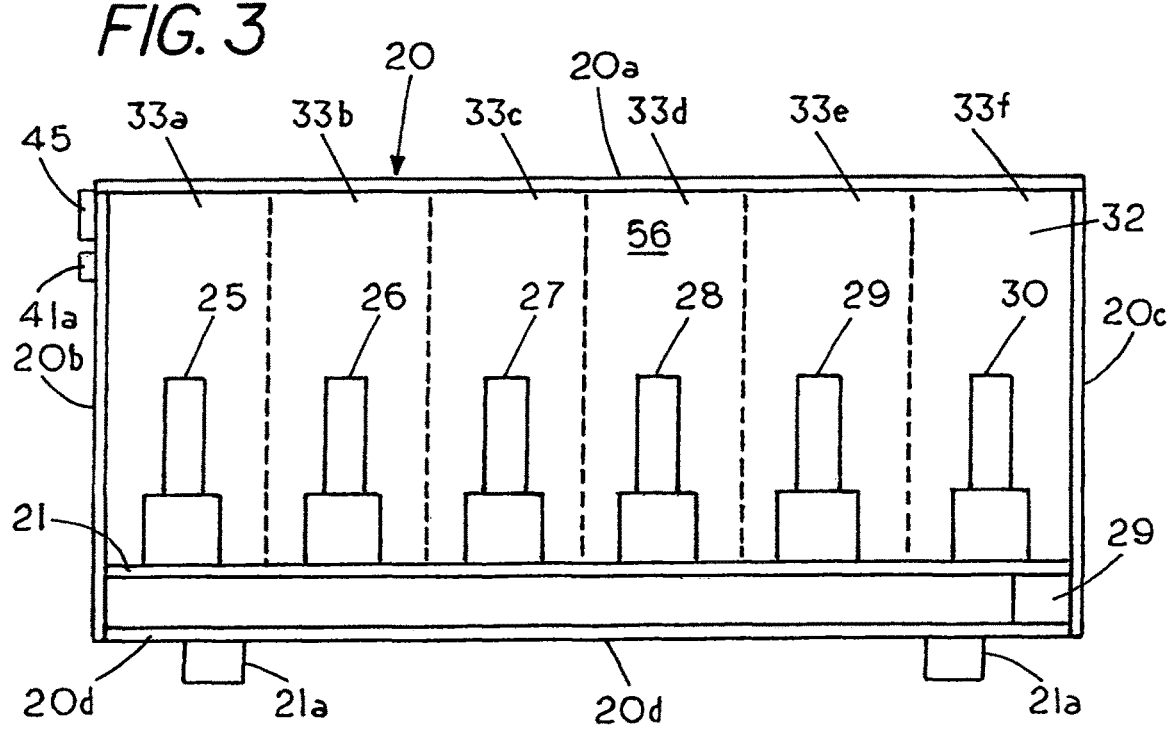
FIG. 3 is a front view of a product display case in an unpowered condition with multiple products visible through a transparent front panel on the product display case.
Figure 4:
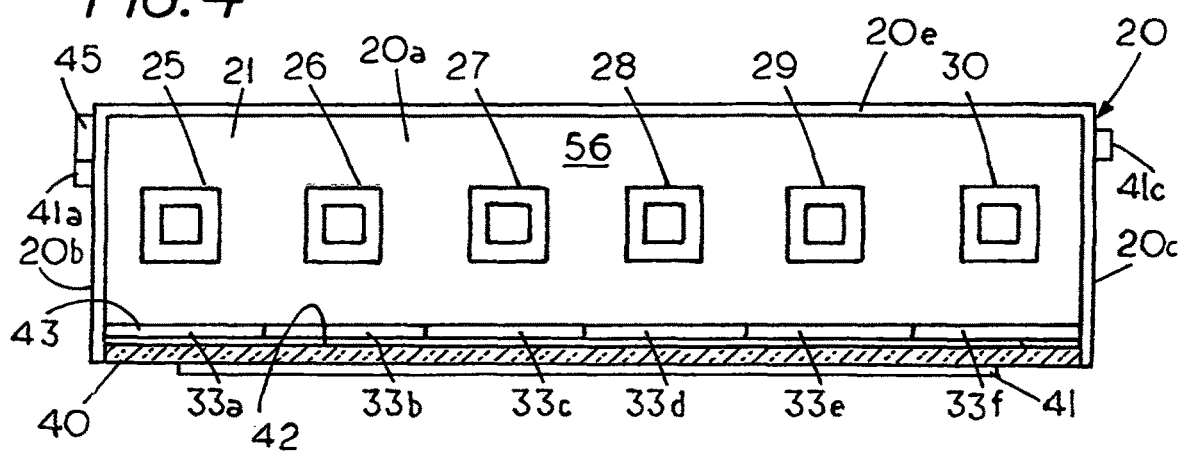
FIG. 4 is a top view of the product display case of FIG. 3 with the transparent front panel including an NFC antenna, a touchscreen and an LED film.

FIG. 3 is a front view of a product display case 20 in an unpowered condition with multiple products 25, 26, 27, 28, 29 and 30 visible to a potential customer through a transparent front panel 32 on the product display case and FIG. 4 is a top view of the product display case of FIG. 3 with a top view of products 25, 26, 27, 28, 29 and 30 also visible to a potential customer through a rigid transparent top panel 20a.

Sandwiched together on product display case 20 are a transparent front panel 40 i.e. a glass panel, which is proximate a see through NFC antenna 31, which is proximate a transparent touchscreen film with the touchscreen film 43 having touch sensitive regions 33a, 33b, 33c, 33d, 33e and 33f with each touch sensitive region associated with a product located proximate the touch sensitive region on touchscreen film 43, which is located on the interior of the display case 20. In a visual mode a LED film 41 located on the exterior of front panel 40 permits see through line of sight viewing of the products in the display case 20 and in an image or display mode the LED film 21 can present information on the products therein through a media player. In the display mode the product display case 20 may display or other displayable information that may be transmitted from a remote processor or from processor 45, which may be a media player.

As shown, in FIG. 4 the product display case 20 includes a proximity sensitive flexible transparent film 43 mountable in an interior surface of a transparent panel 40 of product display case 20. A transparent LED film 41 located on an exterior surface of the transparent panel 40 generates information images for viewing by a person outside the display case in response to a signal from a processor 45. The product display case 20 also includes an external power source 41a connected to and powering the transparent LED film 41 through processor 45 and a wireless transparent NFC antenna 42.

Typically, product display case 20 includes a rigid top side 20a, a rigid bottom side 20d, a rigid front side 32, a rigid back side 20e, a first rigid end side 20b and a second rigid end side 20c that coact with each other to form a product enclosure 56 for displaying and isolating products 25, 26, 27, 28, 29 and 30 from general public access. Typical products, which may be located in enclosure 56 of product display case 20, include a variety of different items of value such as watches, guns or expensive liquors.

As shown in the example herein at least one side of the multisided product display case 20 includes a transparent panel 40 having a product viewing condition where a person outside the display case can view a product within the product display case when the LED film 41 on transparent panel 40 is in an unpowered condition and can view information on the LED film 41 when the LED film 41 is in image viewing condition i.e. a powered condition. In the example shown in FIG. 4, a see through NFC antenna 42 is located proximate a touchscreen 43, which comprises a set of touch sensitive regions 33a, 33b, 33c, 33d, 33e, and 33f that are located proximate an interior face of the transparent outer panel 40 with each of the touch sensitive regions operable for toggling a portion of the LED film 41 between a product viewing condition (i.e. a see through condition) and an image viewing condition where a person can view information displayed on the LED film 41, which is attached to front panel 32 through an adhesive or the like. As shown in FIG. 3 and FIG. 4 the touch screen sensitive regions 33a, 33b, 33c, 33d, 33e and 33f are each located proximate a product proximate the touch screen sensitive region to provide product information on the LED film, which is associated with the product proximate the touchscreen sensitive region.

FIG. 5 is an isolated view showing an example of a portion of a rigid transparent panel 40 such as a transparent glass panel supporting an LED film 41 on an outer surface of a rigid transparent panel 40 with a touchscreen 43 and a transparent NFC antenna 42 sandwichingly mounted on the opposite side of the rigid transparent panel 40.

FIG. 6 is an isolated view of an alternate example of a portion of a rigid transparent glass panel with the rigid transparent panel 40 supporting an LED film 41, a touchscreen 43 and a transparent NFC antenna 42 on an interior face of the rigid transparent glass panel 40 with the aforementioned components mounted in a face-to-face or sandwich mode on an interior surface of a product display case so as to maintain a low profile thereon.

Figure 7:
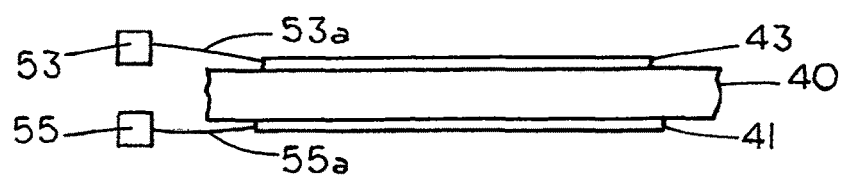
FIG. 7 is an isolated view of a transparent panel supporting and LED film with a touchscreen located on an internal face of the transparent

FIG. 7 is an isolated view of an additional embodiment of the invention that lacks an NFC antenna. In this embodiment the transparent display glass panel 40 of a product display case supports a LED film 41 on one side of the panel 40 with an electrical lead 55a extending from the LED film 41 to a processor 55 for controlling the image shown on the LED film 41. Similarly, the touchscreen panel 43, which is located on an internal face of the transparent panel 40, includes an electrical lead 53a connecting touchscreen panel 43 to a processor 53 for responding to the touchscreen panel, where processor 53 and 55 are separate although a common processor or a media player may be used to display product information on the LED film 41.

A feature of the invention described herein is that in one embodiment one can sandwichingly mount a self adhesive NFC antenna, a self adhesive touchscreen panel comprising a touchscreen film and a self adhesive LED film to an existing product display case to convert a static product display to an interactive product display case without having to modify the structure of the product display case. In another embodiment one can sandwichingly mount a self adhesive touchscreen film to one side of the transparent panel 40 and a self adhesive thin film LED to a transparent panel 40 an existing product display case to convert a static product display to an interactive product display case without having to modify the product display case. In each case a media player can be used to display information on LED film on the product display case.

In the example shown in FIG. 3 and FIG. 4 the product display case 20 is a multisided interactive product display case having a latch 41c that can be remotely controlled to place the product display case 20 in a unlocked condition or a locked condition to prevent a person from obtaining access to the products within the display case without first obtaining authorization to do so. For example, to obtain authorization to remove a product from the display case a person proximate the product display case 20 may enter personal information into a processor 45. Entering personal information into the system may include placing a person's smart phone proximate the NFC antenna 42 to link the smart phone to processor 45 or media player. If accepted, processor 45 sends a signal to release latch 41c thereby allowing the person to open a door on the display case 20. In this example the door is topside 20a, which is hinged (not shown) to the backside 20e. Once acknowledged by the processor 45 the person can open the door (i.e. top side 20a) and remove a product, for example product 25 from within the display case 20. In this example the activity of accessing the central processing can alert a storeowner that there is a customer who may want assistance.

As shown in FIG. 3 and FIG. 4 the display case 20 includes a set of 6 distinct touchscreen panel sections 33a, 33b, 33c, 33d, 33e located on an interior surface with each touch panel section associated with a product proximate the touch panel section. Although the touchscreen comprises a touchscreen film located on the interior of a glass panel in the display case 20 touching on an exterior surface of the glass panel can activate the touchscreen film associated with a particular product. For example, the touch panel 33a is associated with product 25. Similarly, the other touch panels 33b, 33c, 33d and 33e and 33f are each associated with a product proximate thereto. This features allows a person to touch the particular touch panel associated with a product proximate thereto and selectively and quickly pull up information from processor 45, which then displays the information on the LED film 41 on glass panel 40. In this example, the LED film 41 has a transparent mode where a person can see through the LED film 41 to view the product behind the LED film and an information mode where a product behind the LED film may be obscured by the image generated by the processor such as a media player.

As illustrated by FIG. 5 and FIG. 6 the invention includes a kit comprising a LED 5 film 41, a transparent NFC antenna 43 and a touchscreen 42 that can be sandwichingly and adhesively secured to a static display case transparent panel 40 to convert the static display case to an interactive display case, without structurally altering the static display case, thereby permitting a customer to communicate with a remote processor or media player to bring forward product information and display the information on an LED film located on a face of the display case.

I claim:

1. A method of converting a static product display case having a rigid transparent top panel and a rigid transparent front panel to a customer interactive product display case that displays a product within an interactive product enclosure through both the front panel and the top panel without having to modify the structure of the static product display case with the customer interactive product display case having an unpowered condition wherein a product therein is visible through the rigid transparent top panel and a powered condition wherein a portion of the product therein may be obscured by a product information image when the product display case is in a powered condition comprising:

securing a flexible LED (light emitting diode) film proximate a first side of the rigid transparent front panel in the customer interactive product display case;

securing a transparent touchscreen film having a set of distinct touch sensitive regions associated with a product located proximate the touch sensitive region on an interior surface of the customer interactive product display case to allow a viewer to view a product within the customer interactive product display case when the flexible LED (light emitting diode) film is in a transparent mode; and establishing communication between the flexible LED (light emitting diode) film and a media player to display the product information image on the transparent top panel on the product display case by sandwichingly securing the flexible LED (light emitting diode) film, the touchscreen film and an NFC antenna as layers to the rigid transparent front panel of the customer interactive product display case where the product within the customer interactive product display case may be partially obscured by the flexible LED (light emitting diode) film when the product information image is viewable to a person proximate the customer interactive product display case.

2. The method of claim 1 in converting the static product display case to the customer interactive product display case where the static product display case contains the front transparent front panel using a kit that contains:

a LED (light emitting diode) film having a transparent mode; and a touchscreen film with the LED (light emitting diode) film and the touchscreen film securable to the front transparent panel on static product display case to convert the static product display case to the customer interactive product display case.

3. The method of claim 1 in converting the static product display case to the customer interactive product display case further comprises including adhesively securing the LED (light emitting diode) film and the touchscreen film to the transparent front panel by layering, a touch screen, an NFC antenna and the LED (light emitting diode) film to the transparent front panel.

4. The method of claim 1, further comprising placing a smartphone sensitive region on the customer interactive product display case for establishing NFC communication to a smartphone brought into proximity of the smartphone sensitive region with the placement of the smartphone on the smart phone sensitive region sending a signal that allows a person to open a door on the customer interactive product display case to remove and inspect the product therein.

5. The method of claim 4 wherein placing the smartphone on the smartphone sensitive region sends a signal to alert a merchant that there is a customer that may want assistance.

\* \* \* \* \*